United States Patent
Islam

(10) Patent No.: US 8,422,804 B2
(45) Date of Patent: Apr. 16, 2013

(54) COMPRESSED DOMAIN SYSTEM AND METHOD FOR COMPRESSION GAINS IN ENCODED DATA

(75) Inventor: Asad Islam, Richardson, TX (US)

(73) Assignee: The Modern Video Company, Mountain View, CA (US)

( * ) Notice: Subject to any disclaimer, the term of this patent is extended or adjusted under 35 U.S.C. 154(b) by 83 days.

(21) Appl. No.: 13/001,035

(22) PCT Filed: Jun. 22, 2009

(86) PCT No.: PCT/US2009/048181
§ 371 (c)(1),
(2), (4) Date: May 10, 2011

(87) PCT Pub. No.: WO2010/008808
PCT Pub. Date: Jan. 21, 2010

(65) Prior Publication Data
US 2011/0206287 A1    Aug. 25, 2011

Related U.S. Application Data

(60) Provisional application No. 61/074,829, filed on Jun. 23, 2008.

(51) Int. Cl.
G06K 9/36 (2006.01)
G06K 9/46 (2006.01)

(52) U.S. Cl.
USPC .......................................................... 382/233

(58) Field of Classification Search ............ 382/173, 382/224, 232, 233; 375/240.01, 240.25, 375/240.28, E7.027; 348/14.13, 423.1, 552
See application file for complete search history.

(56) References Cited

U.S. PATENT DOCUMENTS

| | | | |
|---|---|---|---|
| 5,596,659 A | 1/1997 | Normile et al. | |
| 6,016,360 A | 1/2000 | Nguyen et al. | |
| 6,052,205 A | 4/2000 | Matsuura | |
| 6,463,178 B1 | 10/2002 | Kondo et al. | |
| 6,625,221 B2 * | 9/2003 | Knee et al. | 375/240.28 |
| 6,697,521 B2 | 2/2004 | Islam et al. | |
| 6,792,153 B1 | 9/2004 | Tsujii | |
| 7,149,811 B2 | 12/2006 | Wise et al. | |
| 7,916,960 B2 | 3/2011 | Mizuno | |
| 8,265,144 B2 * | 9/2012 | Christoffersen et al. | 375/240.1 |

(Continued)

FOREIGN PATENT DOCUMENTS
JP   2007104645   4/2007

OTHER PUBLICATIONS

International Search Report, PCT/US09/48181, dated Jul. 23, 2009.
Written Opinion, PCT/US09/48181, dated Jul. 23, 2009.
International Search Report, PCT/US07/10706, Sep. 15, 2008.
Written Opinion, PCT/US07/10706, Sep. 15, 2008.
Office Action in corresponding Korea Application No. 2011-7001782, dated Aug. 24, 2012, with English translation (7 pgs.).

*Primary Examiner* — Amir Alavi
(74) *Attorney, Agent, or Firm* — DLA Piper LLP (US)

(57) ABSTRACT

A system and method for compressed domain compression improve compression gains in an encoded image, such as a Joint Photographic Experts Group (JPEG)-encoded images or encoded video, such as Motion Joint Photographic Experts Group (Motion JPEG)-encoded video, without fully decoding and re-encoding the compressed images or video.

20 Claims, 3 Drawing Sheets

U.S. PATENT DOCUMENTS

| | | |
|---|---|---|
| 2001/0041011 A1 | 11/2001 | Passagio et al. |
| 2001/0048770 A1 | 12/2001 | Maeda |
| 2003/0002734 A1 | 1/2003 | Islam et al. |
| 2003/0202581 A1 | 10/2003 | Kodama |
| 2005/0063599 A1 | 3/2005 | Sato |
| 2006/0115166 A1 | 6/2006 | Sung et al. |
| 2011/0103445 A1* | 5/2011 | Jax et al. ................. 375/224 |
| 2011/0206287 A1* | 8/2011 | Islam ........................ 382/233 |

* cited by examiner

COMPRESSED DOMAIN SYSTEM AND METHOD FOR COMPRESSION GAINS IN ENCODED DATA

PRIORITY CLAIMS

This application claims priority under 35 USC 120 to U.S. patent application Ser. No. 11/605,892 filed on Nov. 28, 2006 entitled "Efficient Content Compression and Decompression System and Method" which in turn claims the benefit under 35 USC 119(e) to U.S. Provisional Patent Application Ser. Nos. 60/795,822 filed on Apr. 28, 2006 and 60/816,115 filed on Jun. 22, 2006, all of which are incorporated herein by reference.

FIELD

A system and method for compressed domain methodologies for improving compression gains in encoded images without fully decoding and re-encoding the encoded images is described.

BACKGROUND

Content, such as digital data, is comprised of bytes of information, with each byte representing, in some sense, a sample of source data at a particular point in time and/or space. There is usually some type of redundancy in such data. As is well known, this fact is used to compress the data to make it more efficient for data transmission and storage.

In addition to data redundancy, data importance is another factor present in such data. In other words, some parts of the data are more important than others, from the point of view of human perception of the data.

One type of content is digital images. Digital images are comprised of pixels, with each pixel represented by one or more bytes of information. For typical color images, 3 color components (usually Red, Green and Blue) are needed, with each component typically represented by one byte of information. Hence, color images can be adequately represented by 3 bytes of information for every pixel in the image.

The number of pixels in an image is determined by the resolution of the image. A 1-MegaPixel image contains one million pixels. The amount of information carried by a 1-Mega Pixel color image is, therefore, of the order of 3 Megabytes. Today's digital cameras generate images much higher in resolution. A 6-Mega Pixel color image would translate to about 18 MB of data. Since digital images carry so much information and take up lots of space, it is only natural that techniques are developed to compress the large of amount of image data.

The JPEG (Joint Photographic Experts Group) standard is an image compression standard that was standardized in 1992, and is the most commonly used method of compression for photographic images. It is the most common image format used by digital cameras and other photographic image capturing devices—including mobile phones—and is the most common format for storing and transmitting photographic images on the World Wide Web. It is estimated that over 90% of the world's digital images are stored in the JPEG format.

JPEG typically achieves 10 to 1 compression for photographic images with little perceivable loss in image quality. Other image compression algorithms have since been developed that provide additional compression gains over JPEG. Notable among them is the JPEG 2000 still image compression standard, standardized by the Joint Photographic Experts Group in 2000. However, the world of digital images still revolves around JPEG and has yet to migrate to the new image codecs. Part of the reason for this loyalty to JPEG is the simple, fast, yet efficient algorithm that JPEG provides.

One of the challenges of research in image compression is to come up with simple image codecs that provide fast yet efficient implementations of image compression—providing higher compression gains than JPEG but at the speed and complexity of the simple JPEG algorithm.

Thus, it is desirable to provide a technique that boosts up the compression gains of JPEG without adding much to the cost of complexity of the system and it is to this end that the system and method described below are directed.

DETAILED DESCRIPTION OF ONE OR MORE EMBODIMENTS

Figure 1:
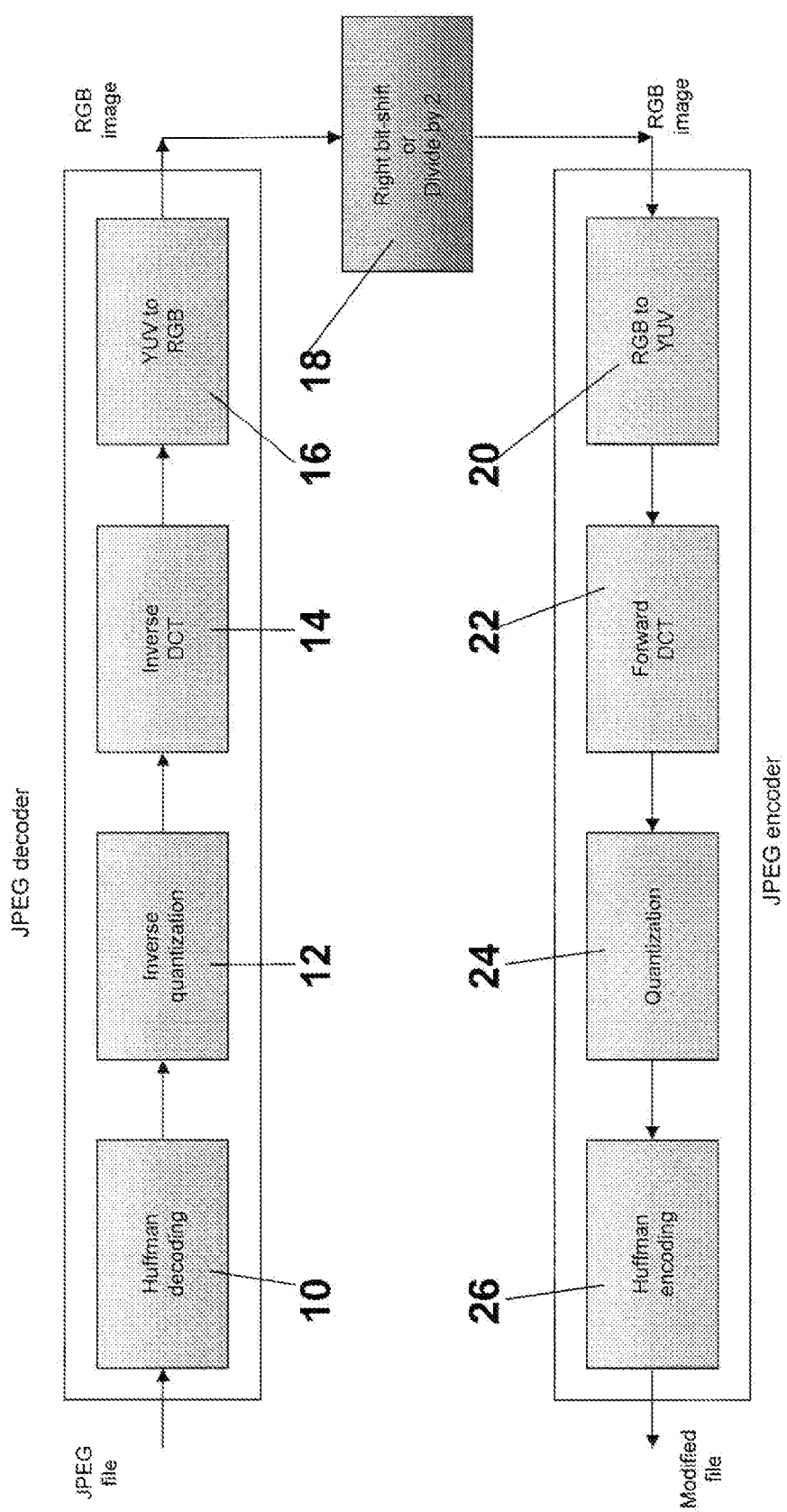
FIG. 1 illustrates a process of applying a 'least significant bit-plane removal' system and method on a JPEG image in spatial domain.

The system and method are particularly applicable to JPEG images and compressing JPEG images and it is in this context that the system and method will be described. It will be appreciated, however, that the system and method has greater utility since it can be used to improve the compression of other image compression algorithms, video/moving picture algorithms and the like and the system and method are not limited to the JPEG example described below. For example, the compressed domain system and method described below can be applied to motion jpeg video.

In the illustrative example, the system and method may be used to further compress JPEG images. The system and method may be implemented in a compressed domain so that full decoding and re-encoding of JPEG images is not required. In terms of complexity, only about 20% or less of the JPEG decoding and encoding complexity is needed to implement the system and method.

Image compression is achieved by de-correlating the image data by using an appropriate mathematical transformation, such as the Discrete Cosine Transform, the Discrete Wavelet Transform, and the Discrete Haar Transform. The characteristics of image data can be analyzed by looking at two important parameters used in image data compression—1) Data Rate, and 2) Data Distortion. In the description below, the image data is analyzed with respect to these two parameters by breaking the image into its constituent image data planes.

1) Data Rate

When the image data is analyzed through individual image bit-planes, the image data correlation decreases as the analysis moves to less significant image bit-planes. Thus, the least significant image bit-plane has the least data correlation and has image data that is very similar in behavior to random noise. Furthermore, it is well-known that random noise has data that is highly de-correlated and has the highest entropy value for a particular source data type so that this data is the hardest to compress. In other words, random data cannot be efficiently compressed.

Since the least significant image bit-plane has a data distribution close to random noise, it cannot be efficiently compressed. As we go up the image bit-planes to more significant bit-planes, the data becomes more correlated and is, therefore, more efficient to compress. In other words, the least significant bit-plane makes up for the largest contribution, among individual image bit-planes, in the compressed image data.

2) Data Distortion

The other important factor in the analysis is the contribution of individual image bit-planes to the distortion (or conversely quality level) of the image. When the image data in terms of its individual bit-planes is analyzed, it is found that each image bit-plane has a certain weight associated with it that contributes collectively to the overall image data value. For example, the least significant bit-plane has a weight of 1, the next significant bit-plane has a weight of 2, and the next has 4, then 8, 16, and so on. In other words, if a bit has a value of 1 in a bit-plane, then its value contribution to the overall pixel data value in the bit-planes, from least significant to most significant, is 1, 2, 4, 8, 16, and so on.

From the weight distribution, it is easy to see that the contribution of the least significant image bit-plane to the overall image pixels is the least. Thus, the loss of the least significant bit-plane would result in a maximum loss of pixel value of 1 from all the pixels in the image. In almost all cases, this loss is not visually discernible. Hence, the least significant image bit-plane adds the least to the image quality.

Removal of Data

As seen from the above analysis, the least significant image bit-plane has two important characteristics: 1) it cannot be compressed efficiently; and 2) it does not add much value to the overall image distortion (or conversely, quality). Hence, if the least significant image bit-plane is removed, its impact is two-fold: 1) the size of the compressed data will reduce significantly; and 2) the removal of such data will not adversely affect the perceptual image quality. The removal of the least significant image bit-plane can be accomplished by right-shifting the image pixel values by one bit shift. It is known that right-shifting a non-negative integer value by one shift is equivalent to integer division of the value by two. Thus, the above concept of increasing the compression efficiency by removing the least significant image bit-plane can be accomplished by dividing the original pixel values by 2.

In the system and method described herein, the removal of one or more bit-planes is implemented in compressed domain (e.g., on an image that is already compressed.) The motivation for such a methodology is the fact that several computing devices, including hand-held mobile devices, are constrained in computing power. In an uncompressed domain, to remove the least significant image bit-plane on an already stored image, such as JPEG, the image must first be fully decoded, then processed as above, and finally fully encoded again as JPEG. For devices constrained in computing power, this entire process is very expensive in terms of processing power and time. A compressed domain approach would not require full decoding and re-encoding of the image, thereby providing significant savings in processing power and time.

Compressed Domain Approach

The concept of 'least significant bit-plane removal' may be applied to image pixel data that is uncompressed, i.e., it can be applied to uncompressed image data at the time of capture and before it is encoded. However, it can also be applied to already encoded JPEG (or any other encoding) images or video. In an uncompressed domain, this process involves full decoding and re-encoding of the image. A much more efficient way of applying this concept is to do the processing in the compressed domain, without going through the full decode-encode cycle that would be required by the uncompressed domain approach.

FIG. 1 illustrates a process of applying a 'least significant bit-plane removal' system and method on a JPEG image in the spatial uncompressed domain. Consider an image that has already been encoded using the JPEG compression standard. FIG. 1 shows how the concept of 'least significant bit-plane removal' can be applied on the JPEG image to increase its compression efficiency. Basically, the image is fully decoded (as illustrated by a Huffman decoder 10, inverse quantizer 12, inverse discrete cosine transform 14 and a YUV to RGB converter 16 which are the typical performed during the decoding of a JPEG encoded image), a bit-shifting or division operation 18 is applied to the raw uncompressed image data, and finally the image is fully re-encoded (using a RGB to YUV converter 20, a forward discrete cosine transform 22, a quantizer 24 and a Huffman encoder 26.)

The modules of Image Transformation (DCT) and Color Transformation (RGB/YUV) in the JPEG codec illustrated in FIG. 1 belong to the class of linear systems. In the analysis that follows, it is shown that these two modules are invariant to (unaffected by) the operation of 'Division by 2', i.e., if O(k) denotes the operation 'Division by 2' on a data set k, and S denotes a linear system, then:

$$S(O(k))=O(S(k)) \quad (1)$$

Figure 2A:
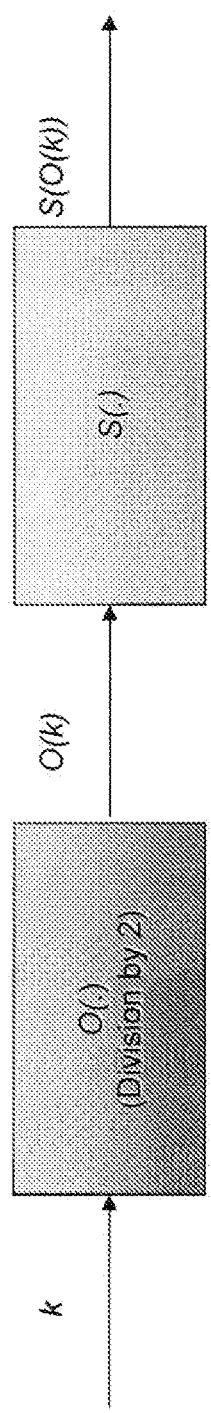
FIGS. 2a and 2b illustrate manifestation of the operations S(O(k)) and O(S(k))
Figure 2B:
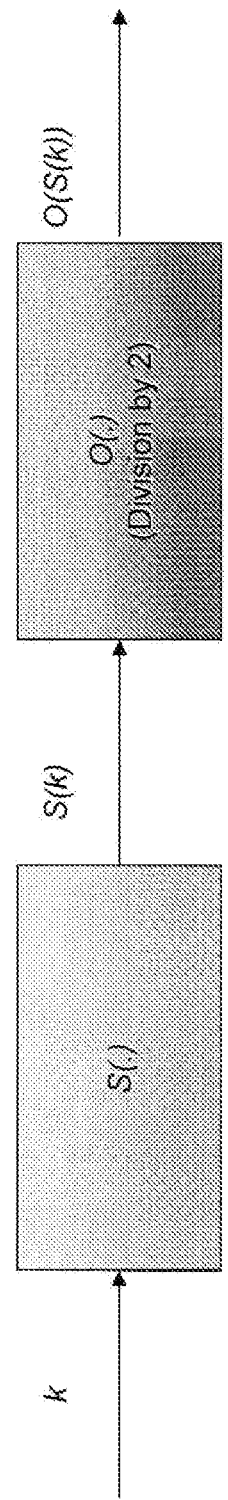

In other words, processing a data set as shown in FIGS. 2a and 2b with the 'Division by 2' operation and then passing it through the system is equivalent to passing it through the system and then processing it with the 'Division by 2' operation.

Color Transformation

Color Transformation in JPEG is done to convert between the color transforms of RGB and YUV color space. There are many variants of the RGB->YUV color transformation, but they all take the following form:

$$Y=\alpha_0 R+\beta_0 G+\gamma_0 B$$

$$U=\alpha_1 R+\beta_1 G+\gamma_1 B$$

$$V=\alpha_2 R+\beta_2 G+\gamma_2 B \quad (2)$$

where, $\alpha_i$, $\beta_i$, $\gamma_i$, i=0, 1, 2, are scalar constants, R, G, B represent the Red, Green and Blue pixel values of the RGB color space, and Y, U, V represent the 1 Luminance (Y) and 2 Chrominance (U, V) values of the YUV color space.

Likewise, there are many variants of the YUV->RGB color transformation, but they all take the following form:

$$R=\alpha_0' Y+\beta_0' U+\gamma_0' V$$

$$G=\alpha_1' Y+\beta_1' U+\gamma_1' V$$

$$B=\alpha_2' Y+\beta_2' U+\gamma_2' V \quad (3)$$

where, $\alpha_i'$, $\beta_i'$, $\gamma_i'$, i=0, 1, 2, are scalar constants, R, G, B represent the Red, Green and Blue pixel values of the RGB color space, and Y, U, V represent the 1 Luminance (Y) and 2 Chrominance (U, V) values of the YUV color space.

Without loss of generality, let us consider one of the above equations for proof of linearity for the 'Division by 2' operation. We have the original data set (R, G, B) represented in RGB color space. Conversion to Y value is given by:

$$Y=\alpha_0 R+\beta_0 G+\gamma_0 B \quad (4)$$

If we apply the 'Division by 2' operation to the original (R, G, B) pixel values, then the data set will be represented by (R/2, G/2, B/2) respectively. Conversion to Y value for the modified data set gives:

$$\alpha_0(R/2) + \beta_0(G/2) + \gamma_0(B/2) = \qquad (5)$$
$$(\alpha_0 R)/2 + (\beta_0 G)/2 + (\gamma_0 B)/2 = (\alpha_0 R + \beta_0 G + \gamma_0 B)/2 = Y/2$$

Thus, YUV values for the data set (R/2, G/2, B/2) are given by (Y/2, U/2, V/2). In other words, performing the 'Division by 2' operation on RGB values and then doing RGB->YUV color transformation is the same as performing the 'Division by 2' operation on YUV values.

Similar results are applicable for YUV->RGB conversion module.

Image Transformation

Image Transformation in JPEG is done to convert YUV image values to DCT transformed coefficients and vice versa. The 2-dimensional DCT transform used in JPEG takes the following form:

$$F(u,v) = \alpha(u)\alpha(v)\sum_{i=0}^{7}\sum_{j=0}^{7} f(i,j)\cos\left[\frac{\pi}{8}\left(\frac{i+1}{2}\right)u\right]\cos\left[\frac{\pi}{8}\left(\frac{j+1}{2}\right)v\right] \qquad (6)$$

where, $\alpha(u)$, $\alpha(v)$, are scalar constants, $f(i,j)$ represents the image (YUV) values, and $F(u,v)$ represents the transformed DCT coefficients.

Consider the input image values $f(i,j)$ used in Eq. (6). If we apply the 'Division by 2' operation to these values, then the data set will be represented by $f(i,j)/2$. Passing this data through the DCT module, and making use of Equation (6), we get the output:

$$\alpha(u)\alpha(v)\sum_{i=0}^{7}\sum_{j=0}^{7}[f(i,j)/2]\cos\left[\frac{\pi}{8}\left(\frac{i+1}{2}\right)u\right]\cos\left[\frac{\pi}{8}\left(\frac{j+1}{2}\right)v\right] =$$

$$\frac{\alpha(u)\alpha(v)}{2}\sum_{i=0}^{7}\sum_{j=0}^{7}[f(i,j)]\cos\left[\frac{\pi}{8}\left(\frac{i+1}{2}\right)u\right]\cos\left[\frac{\pi}{8}\left(\frac{j+1}{2}\right)v\right] =$$

$$\frac{1}{2}\left[\alpha(u)\alpha(v)\sum_{i=0}^{7}\sum_{j=0}^{7}f(i,j)\cos\left[\frac{\pi}{8}\left(\frac{i+1}{2}\right)u\right]\cos\left[\frac{\pi}{8}\left(\frac{j+1}{2}\right)v\right]\right] = F(u,v)/2$$

Thus, the DCT coefficients for the data set $f(i,j)/2$ are given by $F(u,v)/2$. In other words, performing the 'Division by 2' operation on image values and then doing DCT transformation is the same as performing the 'Division by 2' operation on DCT coefficients directly.

Similar results are applicable for the inverse DCT transformation.

Compressed Domain Compression

As seen from the analysis above, the effect of 'Right bit-shift by 1' or 'Division by 2' is invariant to the Color Transform or Image (DCT) Transform. Thus, a compressed domain method and system can produce the same effect for these operations when applied to the DCT coefficients as we get for applying them on input RGB pixel values.

Figure 3:
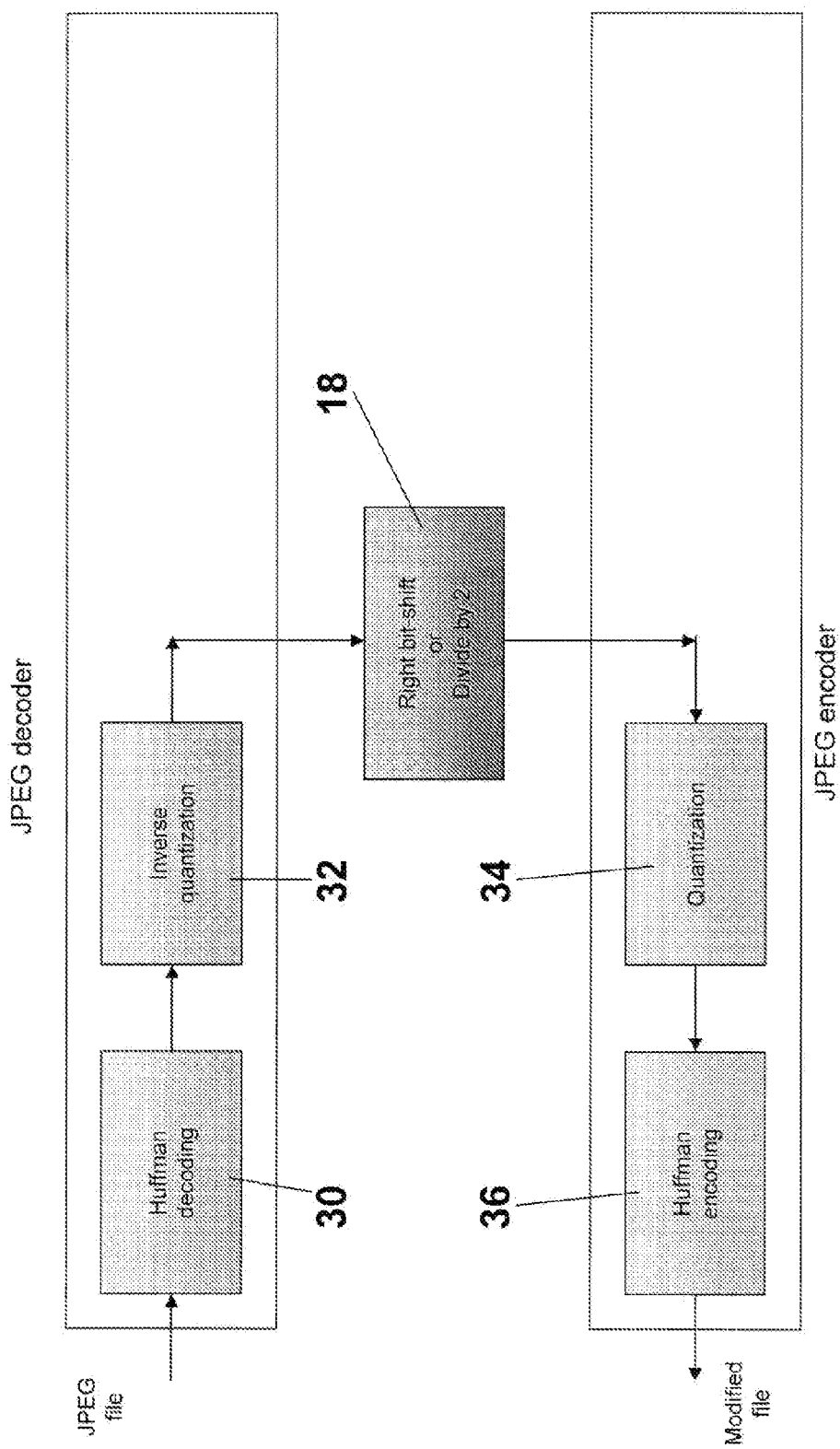
FIG. 3 illustrates a partial decoding/encoding approach of applying the 'least significant bit-plane removal' technique on a JPEG image in compressed domain.

FIG. 3 illustrates a partial decoding/encoding approach of applying the 'least significant bit-plane removal' technique on a JPEG image in compressed domain. The above analysis shows that it is not necessary to fully decode a JPEG image to apply the bit-plane removal operation. Rather, we can decode the JPEG image up to the point where we get the DCT coefficients as shown in FIG. 3 (perform a Huffman decoding 30 and an inverse quantization 32.) The Huffman decoder and the inverse quantizer may be collectively known as a partial decoder. Once the inverse quanitization is performed, the data prior to the inverse DCT are well known DCT coefficients and the least significant bit-plane removal (using a division by 2 operation 18) can be performed on the DCT coefficients. The least significant bit-plane removal may be performed by a least significant bit-plane removal unit that may be implemented in software code or hardware. The least significant bit-plane removal unit may remove the least significant bit-plane and be implemented using a right bit-shift or a divide by 2 operation. Once the one or more bit-planes have been removed, the JPEG bitstream can be re-created without having to fully re-encode the data using the JPEG encoder. In particular, since we already have the DCT coefficients, we only need to apply the rest of the JPEG encoder modules (a quantizer 34 and a Huffman encoder 36) to create a valid JPEG bitstream. The quantizer and the Huffman encoder may be collectively known as a partial encoder. Thus, a 'least significant bit-plane removal' process on a JPEG image may be performed as follows:

1) Partially decode the JPEG image by passing it through Huffman decoder and Inverse Quantizer. This gives us access to DCT coefficients for the JPEG image.

2) Modify the DCT coefficients by dividing them by 2. This produces the same effect as removing the last bit-plane of the RGB pixel values of the image.

3) Partially re-encode the JPEG data by passing the modified DCT coefficients through Forward Quantizer and Huffman encoder.

4) If needed, modify the JPEG Quantization tables in the JPEG header to reflect the Quantization tables used in the Forward Quantizer.

The above compressed domain system and method provides an efficient method for applying the technique of 'least significant bit-plane removal' to boost the compression efficiency of JPEG images because it has been found that the Image and Color Transform modules take up more than 80% of the computational load of the entire JPEG encoding or decoding process. Bypassing these two modules provides highly substantial speed-ups. On power constrained platforms, such as hand held devices, the gains are even more. Tests run on hand-held mobile devices have shown that using this system and method, the image compression/decompression is sped up by 10× as compared to the spatial domain approach shown in FIG. 1.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A compressed domain compression apparatus, comprising:
    a partial decoder that partially decodes an encoded piece of data to generate a partially decoded piece of data;
    a least significant bit plane removal unit that removes at least one least significant bit plane from the partially decoded piece of data to generate a modified partially decoded piece of data ; and
    a partial encoder that encodes the modified partially decoded piece of data to generate fully compressed data that is more compressed than the encoded piece of data.

2. The apparatus of claim 1, wherein the least significant bit plane removal unit performs a divide by two operation to remove at least one least significant bit plane.

3. The apparatus of claim 1, wherein the least significant bit plane removal unit performs a right bit-shift operation to remove at least one least significant bit plane.

4. The apparatus of claim 1, wherein the encoded piece of data further comprises image data.

5. The apparatus of claim 4, wherein the image data further comprises a joint photographic experts group encoded picture.

6. The apparatus of claim 1, wherein the encoded piece of data further comprises video data.

7. The apparatus of claim 6, wherein the video data further comprises a motion joint photographic experts group video.

8. A compressed domain compression method, comprising:
    partially decoding an encoded piece of data to generate a partially decoded piece of data;
    removing, using a least significant bit plane removal unit, at least one least significant bit plane from the partially decoded piece of data to generate a modified partially decoded piece of data ; and
    encoding the modified partially decoded piece of data to generate fully compressed data that is more compressed than the encoded piece of data.

9. The method of claim 8, wherein removing at least one least significant bit plane further comprises performing a divide by two operation to remove the at least one least significant bit plane.

10. The method of claim 8, wherein removing at least one least significant bit plane further comprises performing a right bit-shift operation to remove the at least one least significant bit plane.

11. The method of claim 8, wherein the encoded piece of data further comprises image data.

12. The method of claim 11, wherein the image data further comprises a joint photographic experts group encoded picture.

13. The method of claim 8, wherein the encoded piece of data further comprises video data.

14. The method of claim 13, wherein the video data further comprises a motion joint photographic experts group video.

15. The apparatus of claim 1, wherein the partial decoder further comprises a Huffman decoder that decodes Huffman codes in the encoded piece of data to generate Huffman decoded data and an inverse quantizer unit that inverse quantizes the Huffman decoded data.

16. The apparatus of claim 1, wherein the partial encoder further comprises a quantizer unit that quantizes the modified partially decoded piece of data to generate a quantized piece of data and a Huffman encoder that generates Huffman codes based on the quantized piece of data.

17. The apparatus of claim 1, wherein the partially decoded piece of data further comprises a plurality of inverse quantized transform coefficients.

18. The method of claim 8, wherein partially decoding an encoded piece of data further comprises decoding Huffman codes in the encoded piece of data to generate Huffman decoded data and inverse quantizing the Huffman decoded data.

19. The method of claim 8, wherein encoding the modified partially decoded piece of data further comprises quantizing the modified partially decoded piece of data to generate a quantized piece of data and generating Huffman codes based on the quantized piece of data.

20. The method of claim 8, wherein the partially decoded piece of data further comprises a plurality of inverse quantized transform coefficients.

* * * * *